INVENTOR
JOHN J. KING
BY Robert J. Haase
ATTORNEY

INVENTOR.
JOHN J. KING
BY Robert J. Haase
ATTORNEY

United States Patent Office 3,391,285

Patented July 2, 1968

3,391,285

STALL CIRCUIT FOR MAGNETIC COMMUTATORS

John J. King, Jericho, N.Y., assignor to Sperry Rand Corporation, Great Neck, N.Y., a corporation of Delaware Filed Oct. 21, 1964, Ser. No. 405,492
7 Claims. (Cl. 307—88)

The invention herein described was made in the course of or under a contract or subcontract thereunder, with the Department of the Air Force.

The present invention generally relates to magnetic commutators comprising a plurality of magnetic core devices connected in tandem which are sequentially actuated in response to input pulses. More particularly, the invention is concerned with a magnetic circuit for stalling the operation of a magnetic commutator without disturbing the load encountered by the input pulses.

Magnetic commutator circuits are well known to provide dependable performance which is particularly advantageous in applications which do not demand extremely high switching rates or very low power consumption. In the typical application of the commutator-programmed energization of a multiplicity of utilization devices, each of the magnetic cores comprising the commutator produces an output signal when energized in turn. Each output signal energizes a respective utilization circuit whereby the utilization circuits are energized in the same sequence as the cores. A representative magnetic commutator is described in the paper, "Current Steering in Magnetic Circuits," by J. A. Rajchman et al., IRE Transactions on Electronic Computers, vol. EC–6, No. 1, March 1957, page 21.

Applications frequently arise wherein it is desirable to stall or interrupt the operation of the magnetic commutator for an arbitrary length of time without interfering with the continued application of the input pulses which drive the commutator. The input driving pulses often are derived from the clock pulse source of a computer in which the commutator is used. The clock source, of course, should not encounter any changed loading condition that might tend to alter its periodicity during the interval in which the commutator is stalled. It is also desirable in the interest of preserving the level of reliability inherent in the magnetic components of which the commutator is constructed, that the stall circuit likewise be comprised of magnetic elements.

One object of the invention is to provide a magnetic stall circuit for interrupting the operation of a magnetic commutator for a desired length of time.

Another object is to provide a magnetic stall circuit for interrupting the operating of a pulsed current driven magnetic commutator without changing the loading encountered by the current driving pulses.

These and other objects of the present invention, as will appear from a reading of the following specification, are achieved in a preferred "current-steering" type of magnetic commutator by the provision of a pair of magnetic core elements auxiliary to the cores comprising the commutator per se. Each of the magnetic core elements comprising the commutator excepting one of the cores consists of a set winding, a reset winding and a drive winding. The remaining magnetic core of the commutator additionally is equipped with a second set winding and an inhibit winding. All the set and drive windings, when pulsed, tend to produce the same magnetic state in the magnetic core. The inhibit and reset windings tend to produce the opposite magnetic state. One of the auxiliary cores is identical to the majority cores of the commutator. The other auxiliary core is identical to the singular core of the commutator which is equipped with the additional set winding and the inhibit winding.

The magnetic commutator further includes diodes respectively connected in series circuit with the drive windings of the magnetic cores. Each of the input driving pulses is steered along a respective conductive path determined by voltage previously generated by the magnetic core in that path, which voltage forward biases the diode in said path and back-biases all diodes in all other possible paths. The magnetic cores comprising the commutator circuit are divided into two equal sets. The even numbered cores are driven by current pulses occurring at times interleaving the times of the current pulses which drive the odd numbered cores. Each steered current pulse sets a core which will be used to steer the next succeeding pulse. The $n$th current pulse is steered through the $n$th core to set the first $(n+1)$ core through which the next current pulse will be steered to start a new commutation cycle.

The present invention stalls the output of the magnetic commutator for an arbitrary period by providing an extra path for the $n$th current pulse in addition to the normal path which sets the first core preparatory to the commencing of a new commutation cycle. The extra path comprises the two auxiliary magnetic cores. The $n$th magnetic core of the commutator is the one equipped with the second set winding and the inhibit winding. The identically equipped auxiliary core is connected in series circuit with the $n$th core so that the $n$th current pulse passes through both. Either the $n$th core or the identical auxiliary core is inhibited during the occurrence of the $n$th pulse depending upon whether stalled operation or normal operation is desired.

In the event the $n$th magnetic core is inhibited, the $n$th current pulses sets the first auxiliary core. The next following current pulse is steered through the first auxiliary core and sets the second auxiliary core. The next current pulse is steered through the second auxiliary core and sets the first auxiliary core to complete the first cycle of stalled operation wherein the drive current is steered between the first and second auxiliary cores. The described action continues until the inhibit states of the $n$th magnetic core and the first auxiliary core are inverted, i.e., until the inhibit is removed from the $n$th magnetic core and is applied to the first auxiliary core. Upon the occurrence of the next succeeding drive current pulse, normal sequential operation of the magnetic commutator is restored.

For a more complete understanding of the present invention, reference should be had to the following specification and to figures of which:

Figure 1:
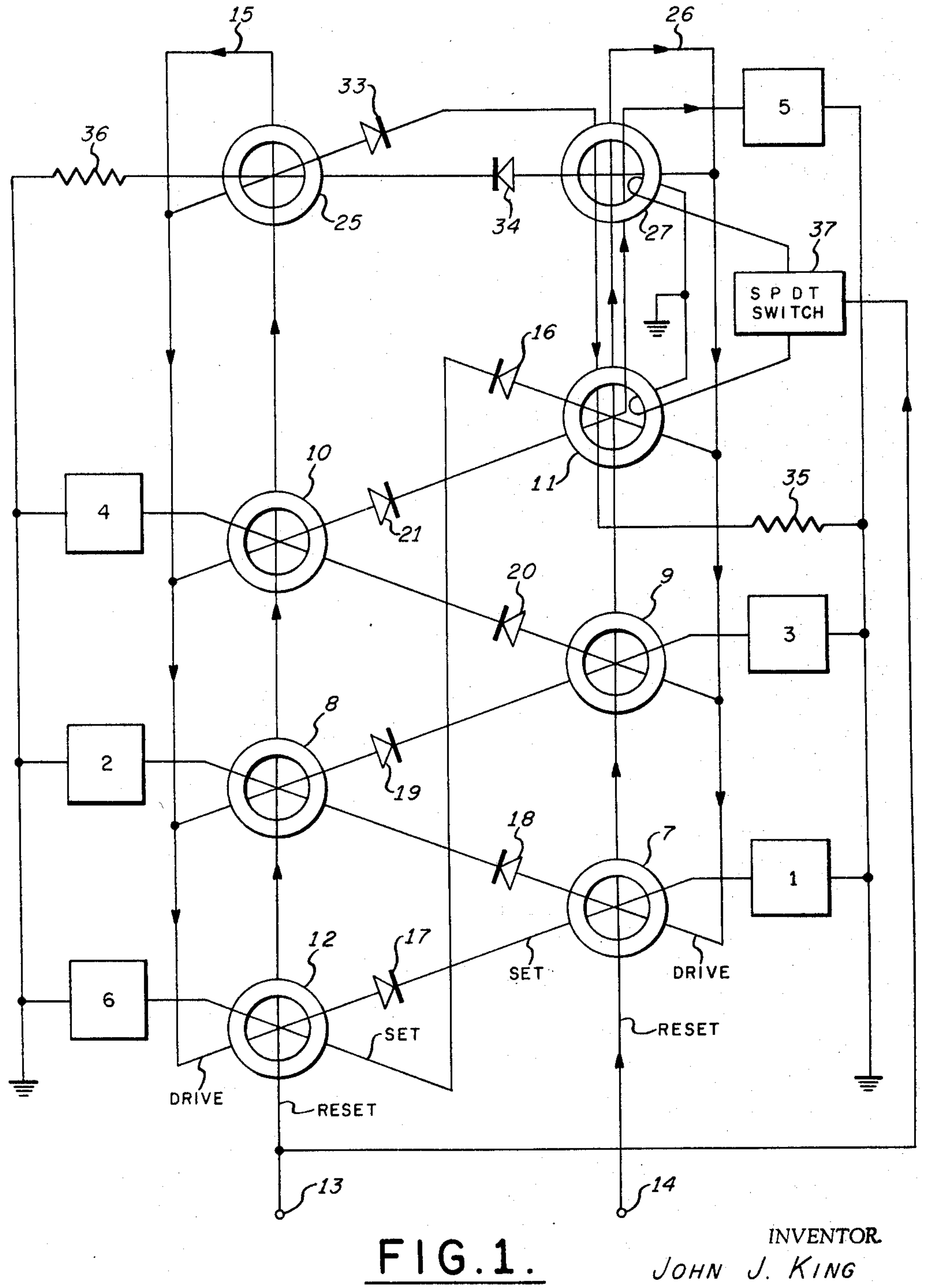
FIG. 1 is a simplified schematic diagram of a preferred embodiment of the present invention adapted for use with a "current-steering" type of magnetic commutator.

The magnetic commutator of FIG. 1 comprises magnetic cores 7, 8, 9, 10, 11 and 12 which are energized in that sequence by input clock pulses applied to terminals 13 and 14. The clock pulses applied to said terminals have the same recurrence rate but are phased in time so that the pulses applied to terminal 13 occur between the pulses applied to terminal 14. It is convenient to generate said pulses, for example, by providing a stable oscillator and a phase splitter (not shown) for deriving two sets of pulses phase displaced relative to each other by one half the recurrence interval. Each of the magnetic cores 7, 8, 9, 10 and 12 has a set winding, a reset winding and a drive winding as designated in the drawing in the case of typical cores 7 and 12. The reset windings of each set of cores are connected in a respective series circuit through which clock pulses are applied to all of the associated drive windings. A clock pulse applied to terminal 13, for example, travels serially through the reset windings of each of the even numbered magnetic cores and is then routed, via lead 15 and in a manner to be described, through one of the parallel-connected drive windings of the even numbered cores. The reset and drive windings of the odd numbered cores are connected in the same fashion.

The set winding associated with a higher numbered core is connected via a respective diode to the drive winding of the next lower numbered core. For example, the set winding of core 12 is connected to the drive winding of core 11 via diode 16. When a pulse applied to terminal 14 is routed through the drive winding of core 11, it is applied via conducting diode 16 to the set winding of core 12. Diodes 17, 18, 19, 20 and 21 similarly connect the set winding of a higher numbered core to the drive winding of the next lower numbered core. It will be noted, of course, that the set winding of core 7 is connected to the drive winding of core 12 via diode 17 because core 7 follows core 12 in the sequence of the ring configuration of the magnetic cores.

The structure and operation of cores corresponding to cores 7, 8, 9, 10, 12 and 25 are well understood in the art. Briefly, and with reference to typical core 25 of FIG. 2, each of said cores has a set winding, a reset winding and a drive winding such as windings 22, 23 and 24, respectively. The core is placed in the same magnetic state by the application of a pulse to the drive winding or to the set winding. The core is placed in the opposite magnetic state by the application of a pulse to the reset winding. The resulting binary states are represented by the direction of the arrows associated with the windings. In operation, a pulse applied to terminal 13 flows serially through the reset winding of each core. Any core already in binary state zero remains in that state whereas a core which was in binary state one is reset to state zero. The transition from state one to state zero induces a potential in the drive winding of the core involved to forward-bias the diode in series with its drive winding and to back-bias all other diodes connected to lead 15 in FIG. 1. Therefore, as the clock pulse flows through the reset windings of the even numbered cores and core 25 and is returned by lead 15 to the parallel-connected diodes, it is directed exclusively through that diode associated with the singular core which has undergone a transition from the binary state one to the binary state zero in response to the clock pulse. As is well understood, only one of the cores 7, 8, 9, 10, 11 and 12 is placed initially into binary state one with all of the other cores being in binary state zero.

Assuming, for example, that core 7 of the odd numbered cores is the one placed in binary state one, the first clock pulse applied to terminal 14 resets core 7 to zero and is returned by lead 26 to each of the parallel-connected diodes 16, 20 and 18 and steered exclusively through diode 18 to the set winding of core 8, placing core 8 in state one, and in effect, shifting the "1" from core 7 to core 8. Upon the occurrence of the next pulse in time (at terminal 13), core 8 is reset to zero and the pulse is routed exclusively through diode 19 to set core 9 to state one. In this manner, the binary "1" is shifted in sequence from one core to the core next following around the commutator ring comprising cores 7, 8, 9, 10, 11 and 12 in response to the successive pulses which appear alternately at terminals 13 and 14. It should be noted that the current pulses which sequentially set the cores are returned to ground through respective loads 1, 2, 3, 4, 5 and 6. The loads are energized in the sequence of their numerical designations in response to the pulses applied to terminals 13 and 14. The structure and operation described up to this point correspond to that described in the aforementioned paper by Rjechman et al.

In accordance with the present invention, the magnetic commutator ring is provided with a magnetic stall circuit for interrupting the normal sequential operation of the commutator for any desired time interval equal to an integral multiple of the repetition interval of the pulses applied to terminals 13 or 14. The stall circuit comprises auxiliary magnetic cores 25 and 27. Auxiliary core 25 is identical to commutator cores 7, 8, 9, 10 and 12. Auxiliary core 27 is identical to core 11. Cores 11 and 27 differ from all the other cores to the extent that the former are provided with two additional windings, namely, an additional set winding and an inhibit winding. The additional windings are shown more clearly in FIG. 3.

Figure 2:
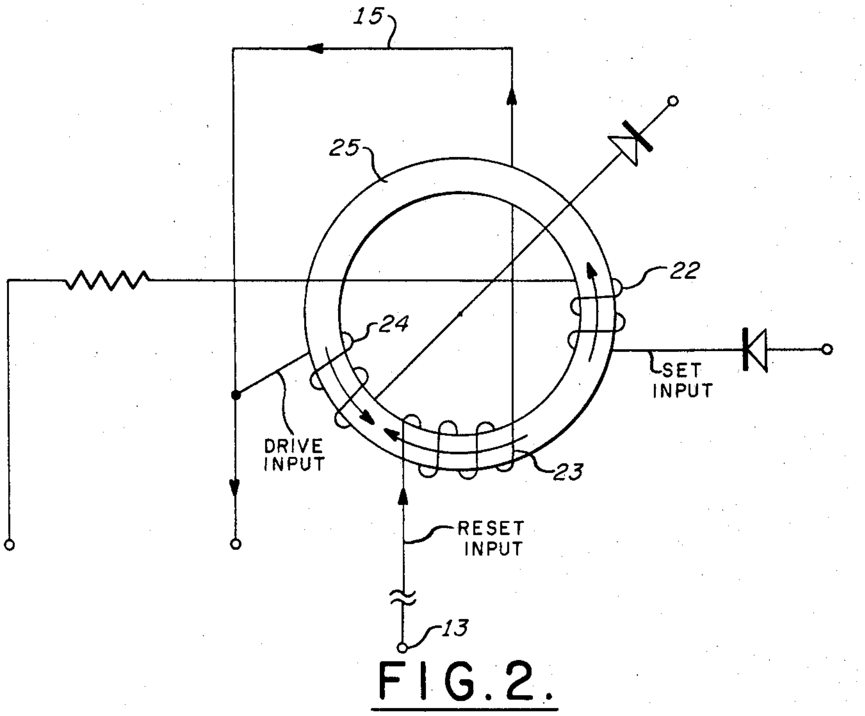
FIG. 2 is a schematic diagram of one of the two types of magnetic cores comprising the embodiment of FIG. 1.
Figure 3:
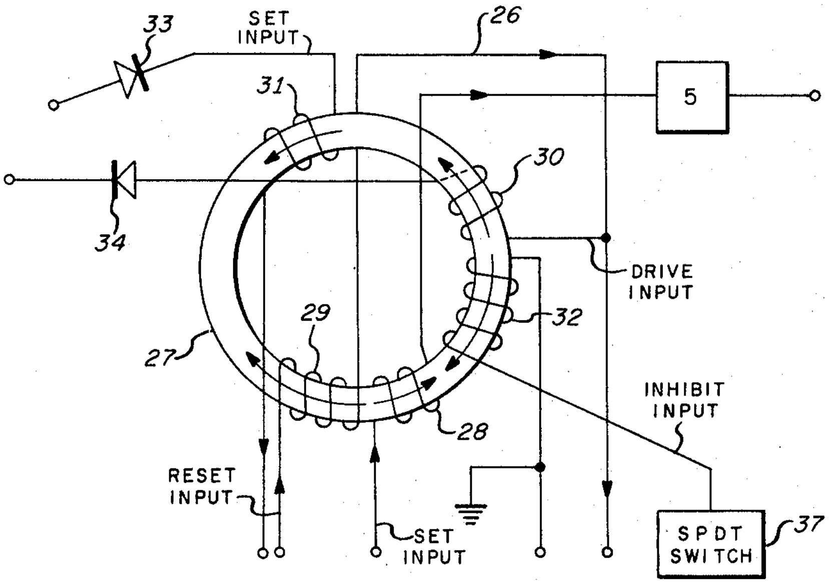
FIG. 3 is a schematic diagram of the other type of magnetic core comprising the embodiment of FIG. 1.

Referring to FIG. 3, set winding 28, reset winding 29 and drive winding 30 correspond in structure and operation to windings 22, 23 and 24, respectively, of core 25 described in connection with FIG. 2. The additional set winding 31 places core 27 in the same magnetic state as set winding 28 and drive winding 30. Inhibit winding 32 places core 27 in the same magnetic state as reset winding 29 as indicated by the directions of the arrows associated with the windings in FIG. 3. Set winding 31 is connected by diode 33 to the drive winding of auxiliary core 25. Drive winding 30 is connected by diode 34 to the set winding of core 25.

The application of a drive pulse to core 27 (following a 1–0 transition) sets core 25 to state one whereas the application of a drive pulse to core 25 (following a 1–0 transition) sets core 27 to state one. Pulses applied to set winding 31 of core 27 and the corresponding set winding of core 11 are returned to ground through auxiliary load 35 of FIG. 1. Similarly, pulses applied to set winding 22 of core 25 is returned to ground through auxiliary load 36. It is preferable but not mandatory that auxiliary loads 35 and 36 present substantially the same impedances to the clock pulse source during the stalled mode as do the main commutator loads 1–5 during the normal operational mode. Set winding 28 of core 27 and the corresponding set winding of core 11 are returned to ground through commutator load 5. An inhibit pulse for application to either the inhibit winding of core 11 or to the inhibit winding of core 27 is derived from terminal 13 and selected by single pole double switch 37. Switch 37 applies each pulse appearing on terminal 13 either to the inhibit winding of core 27 (if normal commutator operation is desired) or to the inhibit winding of core 11 (if it is desired to stall the commutator action).

The energization of the inhibit winding has no effect when cores 11 and 27 are in state zero. If, however, the set winding and the inhibit winding of the same core are simultaneously energized, the core is prevented from switching from the zero state to the one state and remains in the zero state. For example, if core 11 is inhibited, a binary one in core 10 can be shifted only to core 27 in response to a pulse on terminal 13. Upon the occurrence of the next following pulse at terminal 14, the binary one of core 27 is shifted to core 25. Upon the occurrence of the next following pulse at terminal 13, the binary one of core 25 is shifted back to core 27 if core 27 remains uninhibited. Thus, core 25 functions as a pulse delay means connected between drive winding 30 and set winding 31 of core 27. The binary one is shifted back and forth between cores 25 and 27 until switch 37 reverses the application of the inhibit pulse so that core 27 is inhibited and core 11 is not inhibited. Upon the occurrence of the next pulse at terminal 13 immediately following the reversal of switch 37, the binary one is shifted from core 25 into core 11 (placing the binary one back in the commutator ring). The next pulse applied to terminal 14 shifts the one from core 11 into core 12 to restore the normal sequence of operation of the commutator ring.

It will be observed that the normal sequential operation of the commutator ring can be interrupted any time that a binary one is shifted out of core 10 while core 11 is inhibited. If core 11 is not inhibited, the binary one remains in the ring and is not shunted outside the ring into the auxiliary loop consisting of cores 25 and 27. Once in the auxiliary loop, the binary one can be returned to the commutator ring only when the binary one is shifted out of core 25 while core 27 is inhibited.

While the invention has been described in its preferred embodiments, it is to be understood that the words which have been used are words of description rather than limitation and that changes within the purview of the appended claims may be made without departnig from the true scope and spirit of the invention in its broader aspects.

What is claimed is:

1. A device for stalling the operation of a magnetic circuit, said circuit including a first magnetic core, said device comprising:

a second magnetic core and a pulse delay means, said first and second cores having first and second set windings, a reset winding, a drive winding, and an inhibit winding, said first set windings of said first and second cores being connected in a series circuit, said second set windings of said first and second cores being connected in a series circuit, said pulse delay means being connected between said drive winding and one of said set windings of said second core, and means for inhibiting one of said first and second cores.

2. A device for stalling the operation of a magnetic circuit, said circuit including a first magnetic core, said device comprising:

a second magnetic core and a third magnetic core, said first and second cores having first and second set windings, a reset winding, a drive winding, and an inhibit winding, said third core having a set winding, a reset winding and a drive winding, said first set windings of said first and second cores being connected in a series circuit, said second set windings of said first and second cores being connected in a series circuit with said drive winding of said third core, said drive winding of said second core being connected in a series circuit with said set winding of said third core, and means for inhibiting one of said first and second cores.

3. A device for stalling the operation of a magnetic circuit, said circuit including a first magnetic core, said device comprising:

a second magnetic core and a third magnetic core, said first and second cores having first and second set windings, a reset winding, a drive winding, and an inhibit winding, said third core having a set winding, a reset winding, and a drive winding, said first set windings of said first and second cores being connected in a series circuit, said second set windings of said first and second cores being connected in a series circuit with said drive winding of said third core, said drive winding of said second core being connected in a series circuit with said set winding of said third core, means for pulsing said reset winding of said third core and for pulsing said reset windings of said first and second cores so that said reset windings of said first and second cores are pulsed at times different from the times at which said reset windings of said third core is pulsed, and means for inhibiting one of said first and second cores at times synchronous to the time when said reset winding of said third core is pulsed.

4. A device for stalling the operation of a magnetic commutator, said commutator including a plurality of first magnetic cores and an equal number of utilization devices which are energized sequentially by said first magnetic cores, said device comprising second and third magnetic cores and first and second loads, said second core and one of said plurality of first cores having first and second set windings, a reset winding, a drive winding, and an inhibit winding, said third core having a set winding, a reset winding and a drive winding, said first set windings of said one core and said second core being connected in a series circuit with one of said utilization devices, said second set windings of said one core and said second core being connected in a series circuit with said drive winding of said third core and said first load, said drive winding of said second core being connected in a series circuit with said set winding of said third core and said second load, and means for inhibiting one of said first and second cores.

5. The device defined in claim 4 wherein said first and second loads have substantially the same impedance as each said utilization device.

6. A device for stalling the operation of a magnetic commutator, said commutator including a plurality of first magnetic cores and an equal number of utilization devices which are energized sequentially by said first magnetic cores, said device comprising second and third magnetic cores and first and second loads, said second core and one of said plurality of first cores having first and second set windings, a reset winding, a drive winding, and an inhibit winding, said third core having a set winding, a reset winding and a drive winding, said first set windings of said one core and said second core being connected in a series circuit with one of said utilization devices, said second set windings of said one core and said second core being connected in a series circuit with said drive winding of said third core and said first load, said drive winding of said second core being connected in a series circuit with said set winding of said third core and said second load, means for pulsing said reset winding of said third core and for pulsing said reset windings of said first and second cores so that said reset windings of said first and second cores are pulsed at times different from the times at which said reset winding of said third core is pulsed, and means for inhibiting one of said first and second cores at times synchronous to the times when said reset winding of said third core is pulsed.

7. The device defined in claim 6 wherein said first and second loads have substantially the same impedance as each said utilization device.

References Cited

UNITED STATES PATENTS 3,351,921 11/1967 Briggs -------------- 340—174

BERNARD KONICK, *Primary Examiner.*

P. SPERBER, *Assistant Examiner.*